(12) United States Patent
Sriraghavan et al.

(10) Patent No.: US 8,788,598 B2
(45) Date of Patent: Jul. 22, 2014

(54) SYSTEM FOR AND METHOD OF PROVIDING REMOTE ACCESS TO AN EMAIL PLATFORM

(75) Inventors: Priyanka G. Sriraghavan, Chennai (IN); Lakshmi Nrusimhan N. V., Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 715 days.

(21) Appl. No.: 12/638,645

(22) Filed: Dec. 15, 2009

(65) Prior Publication Data

US 2011/0145340 A1    Jun. 16, 2011

(51) Int. Cl.
*G06F 15/16* (2006.01)

(52) U.S. Cl.
USPC ............................................. 709/206

(58) Field of Classification Search
USPC ............................................. 709/206
See application file for complete search history.

(56) References Cited

U.S. PATENT DOCUMENTS

| 6,741,855 B1* | 5/2004 | Martin et al. | 455/419 |
| 2009/0064297 A1* | 3/2009 | Selgas et al. | 726/6 |

* cited by examiner

*Primary Examiner* — Maceeh Anwari (57) ABSTRACT

A system for and method of providing remote access to an email platform. The system and method may include receiving, from a user system, authentication data that comprises an authentication code that is associated with a user of the user system via a network, receiving, from the user system, mail mimic message data that indicates at least one mail service operation to be performed by an email system, and outputting, to the email system, one or more command signals that initiate the performance of the mail service operation.

22 Claims, 6 Drawing Sheets

| Exemplary Mail Mimic Message Types | Exemplary Mail Mimic Formatted Messages |
|---|---|
| Sending New Mail Message (SNMM) | SNMM: Sub- "Annual Meeting at Headquarters" Message-"Jane – Are you planning to attend?" To-janedoe@acme.com Copy-johndoe@acme.com.     — 400 |
| Checking for New Mail Message (CNMM) | CNMM: New Messages?     — 402 |
| Setting Calendar Reminder (SCR) | SCR: "Meeting with Headquarters" On-03/16/2010 From-4:30 PM To-7:30 PM.     — 404 |
| Setting Out of Office Reply (SOOR) | SOOR: "Unexpected extension of vaction. Please contact my manager (John Doe) for immediate assistance." From-10/02/2009 To-10/04/2009.     — 406 |
| Disabling Out of Office Reply (DOOR) | DOOR: End-10/05/2009.     — 408 |

SYSTEM FOR AND METHOD OF PROVIDING REMOTE ACCESS TO AN EMAIL PLATFORM

BACKGROUND INFORMATION

In general, some employees of a company may remotely access applications (e.g., an email application, a calendar application) available on a company server remotely. In such instances, these employees may access the applications at a remote location using a private connection, such as a Virtual Private Network (VPN) connection. These private connections, however, may not be accessible to the employees unless an internet connection is available.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

A remote access system may allow registered users at remote locations to initiate functions (e.g., mail service operations) of an email application that resides on an email system that is coupled to a private network. The users may initiate these functions by transmitting a message (e.g., a text message, an email message, an instant message) in a particular format to the remote access system using user systems (e.g., a mobile telephone, a personal digital assistant (PDA)). A mail service operation may include any function that is configured to be performed by an email application (e.g., the Outlook email application designed by the Microsoft Corporation of Redmond, Wash.). A user system may include any system that is configured to transmit message data (e.g., mail mimic message data) to a remote access system.

For example, a first user may initiate a Sending-New-Mail mail service operation by transmitting message data in a first format to the remote access system using a first user system (e.g., the first user's mobile telephone). In another example, a second user may initiate a Setting-Out-of-Office-Reply mail service operation by transmitting message data in a second format to the remote access system using a second user system (e.g., the second user's lap top computer). In yet another example, a third user may initiate a Setting-Calendar-Reminder mail service operation by transmitting message data in a third format to the remote access system using a third user system (e.g., the third user's PDA).

A registered user may include a user that has registered with the remote access system during a registration stage to initiate mail service operations remotely. During a registration stage, a user may register with the remote access system by inputting registration data using a user system. In one embodiment, registration data may include one or more mobile telephone numbers associated with one or more user systems from which a user intends to transmit mail mimic message data to the remote access system. In another embodiment, registration data may include one or more email addresses associated with one or more email accounts from which a user intends to transmit mail mimic message data to the remote access system. In yet another embodiment, registration data may include information associated with one or more email systems (e.g., internet protocol (IP) address of an email system, name of an email system, type of email system) at which a user has an email account. In yet a further embodiment, registration data may include any, or a combination, of a user code (e.g., an employee code), a date on which a user is associated with the implementers of the remote access system (e.g., a date on which a employee started working at a company implementing the remote access system), a user's date of birth, or any other information that may be used to validate a user's identity. In response to receiving registration data, the remote access system may authenticate the registration data, store the authenticated registration data, and transmit an authentication code to the user via a user system.

After the registration stage, a registered user may access the remote access system after successfully authenticating with the remote access system. A registered user may authenticate with the remote access system by transmitting authentication data to the remote access system using a user system. In one embodiment, authentication data may include an authentication code (e.g., data that includes a code provided by the remote access system for authentication purposes) and identification data (e.g., data that identifies a user system or a user).

An authenticated and registered user may use the remote access system to initiate mail service operations remotely by transmitting mail mimic message data in a particular format to the remote access system using a user system. For example, a user may initiate a Sending-New-Mail mail service operation that triggers an email system to send a new email message by transmitting mail mimic message data in a Sending-New-Mail format. In another example, a user may initiate a Setting-Out-of-Office-Reply mail service operation that triggers an email system to set an out of office reply by transmitting mail mimic message data in a Setting-Out-of-Office-Reply format. In yet another example, a user may initiate a Setting-Calendar-Reminder mail service operation that triggers an email system to set a calendar reminder by transmitting mail mimic message data in a Setting-Calendar-Reminder format. Accordingly, a user may remotely access email systems that are coupled to private networks by transmitting mail mimic message data in a predefined format to the remote access system using a user system.

It should be noted that mail mimic message data may initiate one or more mail service operations. In one embodiment, a maximum amount of mail service operations that may be initiated in a single mail mimic message may be determined by the implementers of the remote access system. Accordingly, the remote access system may be configured to verify that a mail mimic message does not initiate an amount of mail service operations over the maximum amount of mail service operations.

Figure 1:
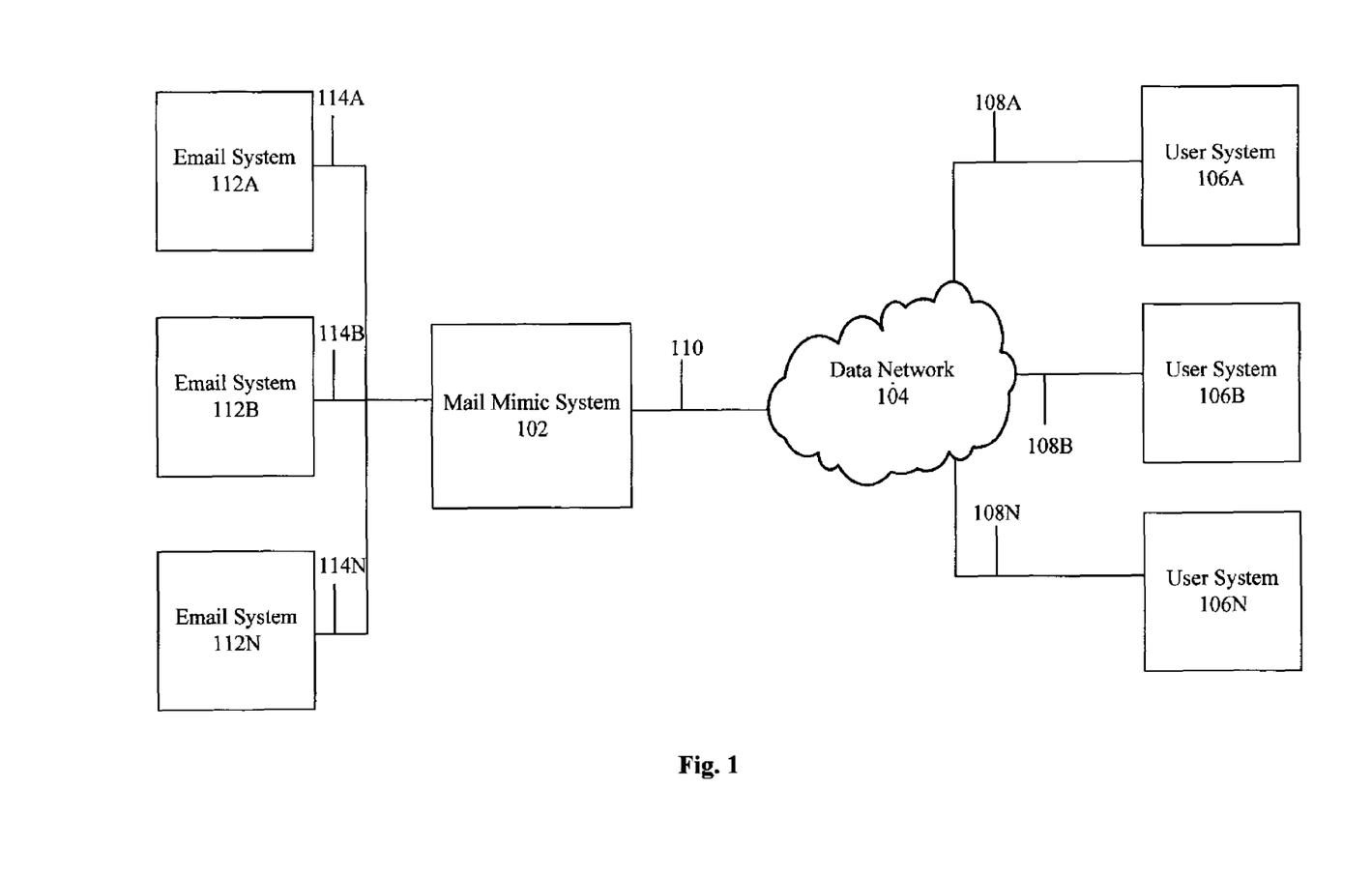
FIG. 1 is a schematic diagram illustrating a remote access system according to a particular embodiment.

FIG. 1 is a schematic diagram illustrating a remote access system according to a particular embodiment. A remote access system may communicatively couple together any, or a combination, of a mail mimic system 102, user systems 106A, 106B, 106N, and email systems 112A, 112B, 112N, using any, or a combination, of data network 104 and data paths 108A, 108B, 108N, 110, 114A, 114B, 114N. Accordingly, data signals may be transmitted to any of the components of the remote access system and transmitted from any of the components of the remote access system using any, or a combination, of data network 104 and data paths 108A, 108B, 108N, 110, 114A, 114B, 114N. For example, registration data signals, authentication data signals, mail mimic data signals, or any other data signals may be transmitted to any of the components of the remote access system and transmitted from any of the components of the remote access system using any, or a combination, of data network 104 and data paths 108A, 108B, 108N, 110, 114A, 114B, 114N.

Data network 104 may be a wireless network, a wired network, or any combination of wireless network and wired network. For example, data network 104 may include one or more of a fiber optics network, a passive optical network, a cable network, an Internet network, a satellite network (e.g., operating in Band C, Band Ku, or Band Ka), a wireless local area network (LAN), a Global System for Mobile Communication (GSM), a Personal Communication Service (PCS), a Personal Area Network (PAN), D-AMPS, Wi-Fi, Fixed Wireless Data, IEEE 802.11a, 802.11b, 802.15.1, 802.11n and 802.11g or any other wired or wireless network for transmitting and/or receiving a data signal. In addition, data network 104 may include, without limitation, a telephone line, fiber optics, IEEE Ethernet 802.3, a wide area network (WAN), a LAN, or a global network, such as the Internet. Also, data network 104 may support, an Internet network, a wireless communication network, a cellular network, or the like, or any combination thereof. Data network 104 may further include one, or any number of the exemplary types of networks mentioned above operating as a stand-alone network or in cooperation with each other. Data network 104 may utilize one or more protocols of one or more network elements to which it is communicatively coupled. Data network 104 may translate to or from other protocols to one or more protocols of network devices. Although data network 104 is depicted as one network, it should be appreciated that according to one or more embodiments, data network 104 may comprise a plurality of interconnected networks, such as, for example, a service provider network, the Internet, a broadcaster's network, a cable television network, corporate networks, and home networks.

Mail mimic system 102 and user systems 106A, 106B, 106N may transmit data to and receive data from data network 104 representing registration data, authentication data, mail mimic data, and other data. The data may be transmitted and received utilizing a standard telecommunications protocol or a standard networking protocol. For example, one embodiment may utilize Session Initiation Protocol (SIP). In other embodiments, the data may be transmitted, received, or a combination of both, utilizing other VoIP or messaging protocols. For example, data may also be transmitted, received, or a combination of both, using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and systems suitable for transmitting and receiving data. Data may be transmitted and received wirelessly or may utilize cabled network or telecom connections such as: an Ethernet RJ45/Category 5 Ethernet connection, a fiber connection, a traditional phone wire-line connection, a cable connection, or other wired network connection.

Data network 104 may use standard wireless protocols including IEEE 802.11a, 802.11b and 802.11g. Data network 104 may also use protocols for a wired connection, such as an IEEE Ethernet 802.3.

User systems 106A, 106B, 106N may be communicatively coupled to data network 104 via data paths 108A, 108B, 108N, respectively. The user systems 106A, 106B, 106N may include, but are not limited to, computer devices or communications devices including, e.g., a personal computer (PC), a workstation, a PDA, a mobile device, a handheld PC, a thin system, a fat system, a network appliance, a lap top device, a set top box, a VoIP device, a client system, an end-user system, or any other device that is configured to transmit registration data, authentication data, and mail mimic message data and receive authentication codes.

Mail mimic system 102 may be communicatively coupled to data network 104 via data path 110 and email systems 112A, 112B, 112N via data paths 114A, 114B, 114N, respectively. The mail mimic system 102 may include, but is not limited to, a computer device or communications device including, e.g., a personal computer (PC), a workstation, a mobile device, a thin system, a fat system, a network appliance, an Internet browser, a server, a lap top device, a VoIP device, an ATA, a video server, a Public Switched Telephone Network (PSTN) gateway, a Mobile Switching Center (MSC) gateway, or any other device that is configured to receive registration data, authentication data, and mail mimic data, transmit authentication codes, register one or more users, authenticate one or more users, and initiate the performance of one or more mail service operations by one or more emails systems. Details of the mail mimic system 102 are provided below.

Email systems 112A, 112B, 112N may be communicatively coupled to the mail mimic system 102 via data paths 114A, 114B, 114N, respectively. The email systems 112A, 112B, 112N may include, but are not limited to, computer devices or communications devices including e.g., a personal computer (PC), a workstation, a thin system, a fat system, a network appliance, an email server, or any other device that is configured to receive commands signals and execute mail service operations of email applications in accordance with the command signals. A command signal may include data that initiates the performance of one or more mail service operations by email applications.

Data paths disclosed herein may include any device that communicatively couples one or more devices to each other. For example, data paths may include one or more networks (e.g., a wireless network, a LAN) or one or more conductive wires (e.g., copper wires).

Figure 2:
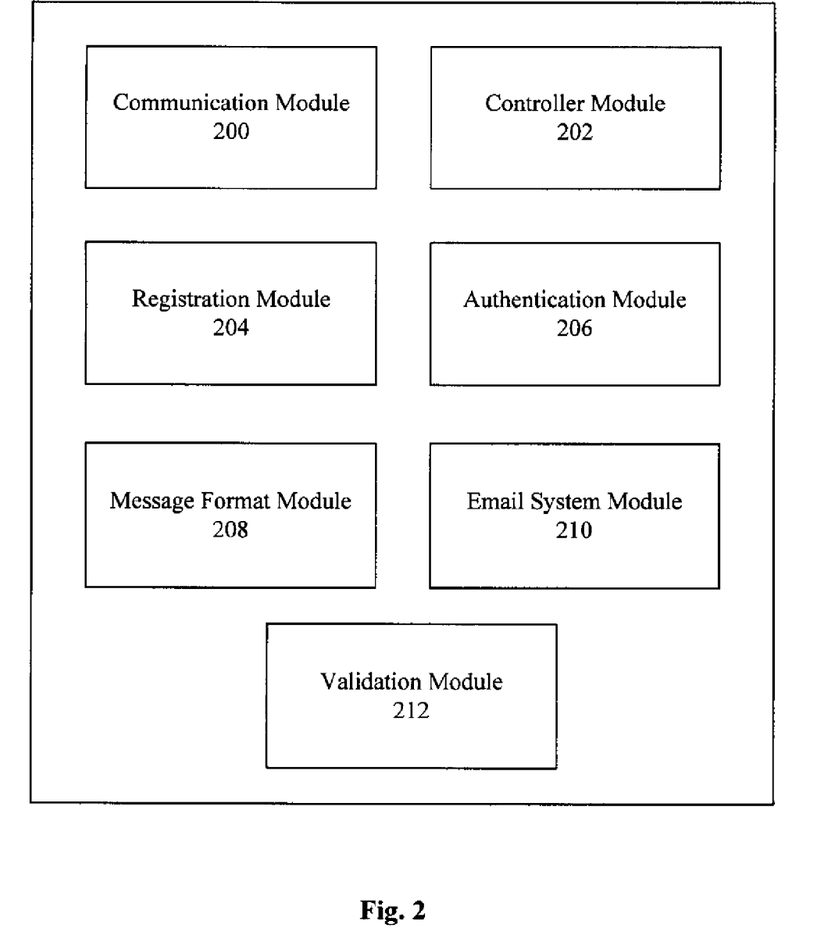
FIG. 2 is a block diagram of a hardware component of a mail mimic system of a particular embodiment.

FIG. 2 is a block diagram of a hardware component of a mail mimic system of a particular embodiment. The mail mimic system 102 may include a communication module 200, a controller module 202, a registration module 204, an authentication module 206, a message format module 208, an email system module 210, and a validation module 212. It is noted that the modules 200, 202, 204, 206, 208, 210, and 212 are exemplary. The functions of the modules 200, 202, 204, 206, 208, 210, and 212, may be performed at other modules remote or local to the mail mimic system 102, and the modules 200, 202, 204, 206, 208, 210, and 212 may be combined or separated.

The communication module 200 may include computer-implemented software, hardware, or a combination of both, configured to provide communication between the mail mimic system 102 and user systems 106A, 106B, 106N via data path 110 and between the mail mimic system 102 and email systems 112A, 112B, 112N via data paths 114A, 114B, 114N, respectively. In one embodiment, the communication module 200 may be configured to receive or transmit data signals to and from one or more components of the remote access system. In another embodiment, the communication module 200 may be configured to transmit the data signals or messages received from other components in the remote access system to the other modules 202, 204, 206, 208, 210, and 212 and may communicate data signals or messages received from the other modules 202, 204, 206, 208, 210, and 212 to other components in the remote access system.

The registration module 204 may include computer-implemented software, hardware, or a combination of both, configured to register users with the remote access system. The registration module 204 may register users with the remote access system by receiving registration data from the users. In one embodiment, registration data may include one or more mobile telephone numbers associated with one or more user systems from which a user intends to transmit mail mimic message data to the remote access system. In another embodiment, registration data may include one or more email addresses associated with one or more email accounts from which a user intends to transmit mail mimic message data to the remote access system. In yet another embodiment, registration data may include information associated with one or more email systems at which a user has an email account. In yet a further embodiment, registration data may include any, or a combination, of a user code (e.g., an employee code), a date on which a user is associated with the implementers of the remote access system (e.g., a date on which a employee started working at a company implementing the remote access system), a user's date of birth, or any other information that may be used to validate a user's identity.

By way of non-limiting example, the registration module 204 may receive registration data from a first user (e.g., "John Doe") that includes a mobile telephone number (e.g., "555-555-5555") associated with a user system (e.g., a mobile telephone) from which John Doe intends to transmit mail mimic message data. The registration module 204 may also receive registration data that includes an email address (e.g., JohnDoe@personalemail.com) associated with an email account from which John Doe intends to transmit mail mimic message data. The registration module 204 may further receive registration data that includes email system information (e.g., IP address of 123.5.155.0) that is associated with an email system at which John Doe has an email account.

Based on the registration data received, the registration module 204 may verify (e.g., authenticate) that the user transmitting the registration data is authorized to access email applications remotely using the remote access system. In one embodiment, the registration module 204 may verify that a user is authorized to use the remote access system by comparing the registration data received to pre-stored data that indicates one or more users or one or more user systems that are authorized to access email applications remotely using the remote access system.

The registration module 204 may be configured to store registration data associated with one or more verified (or authenticated) users in one or more user profiles that are stored in a registry (e.g., a data base that stores one or more user profiles). The registration module 204 may also be configured to transmit an unique authentication code to registered users for future authentication processes.

In one embodiment, a user may register with the remote access system to access email applications remotely by transmitting a pre-defined message (e.g., texting "Mail_Mimic" to "5555") to a pre-defined number associated with a mail account associated with the registration module 204 using a user system. Accordingly, the registration module 204 may use the identification information associated with the mail account that transmitted the pre-defined message (e.g., the mobile telephone number of the mobile telephone, the email address of the email account) to verify authorization, create and store a user profile, and transmit an unique authentication code. In one embodiment, the registration module 204 may store one or more user profiles associated with one or more users. In such embodiments, the storage of the one or more user profiles may be distributed over one or more systems.

The authentication module 206 may include computer-implemented software, hardware, or a combination of both, configured to receive authentication data from a user prior to allowing a user to transmit mail mimic message data. In one embodiment, authentication data may include the unique authentication code provided during the registration stage or at another time. In another embodiment, authentication data may include identification information that identifies the user or the user system associated with the authentication data.

The authentication module 206 may authenticate the user or the user system by comparing the authentication data received to the data stored in the user's profile. If, for example, the authentication data received is not equivalent to data stored in any user profile, the authentication module 206 may determine that the user is not authenticated to use the mail mimic system 102 and may transmit a message indicating the authentication failure to the user system. If, however, the authentication data received is equivalent to data stored in at least one user profile, the authentication module 206 may determine that the user is authenticated to use the mail mimic system 102 and may allow the user to transmit mail mimic message data to the mail mimic system 102 using a user system.

The controller module 202 may include computer-implemented software, hardware, or a combination of both configured to receive mail mimic message data from an authenticated user via a user system. In one embodiment, the controller module 202 may allow an authenticated and registered user to initiate mail service operations remotely by transmitting mail mimic message data in a particular format to the mail mimic system 102 using a user system. For example, the controller module 202 may allow a user to initiate a Sending-New-Mail mail service operation that triggers an email system to send a new email message by transmitting mail mimic message data to the mail mimic system 102 in a Sending-New-Mail format. In another example, the controller module 202 may allow a user to initiate a Setting-Out-of-Office-Reply mail service operation that triggers an email system to set an out of office reply by transmitting mail mimic message data to the mail mimic system 102 in a Setting-Out-of-Office-Reply format. In yet another example, the controller module 202 may allow a user to initiate a Setting-Calendar-Reminder mail service operation that triggers an email system to set a calendar reminder by transmitting mail mimic message data to the mail mimic system 102 in a Setting-Calendar-Reminder format.

The controller module 202 may be configured to control the flow of execution of the mail service operation once mail mimic message data has been received. Accordingly, the controller module 202 may be configured to manage one or more requests or responses associated one or more modules via a communication interface (e.g., the communication module 200). The controller module 202 may also be configured to initiate the registration process by the registration module 204. The controller module 202 may also be configured to initiate the authentication process by the authentication module 206. The controller module 202 may also be configured to ensure that the messages (or data) transmitted between a user system and the mail mimic system and between the mail mimic system and an email system are in the proper format by interacting with the message format module 208. The controller module 202 may also be configured to initiate the establishment of a connection with an email system and the execution of the mail service operation by interacting with the email system module 210.

The message format module 208 may include computer-implemented software, hardware, or a combination of both, configured to determine if the mail mimic message data received is in the proper format. Based on the pre-defined formats associated with one or more mail service operations, the message format module 208 may determine if the mail mimic message data received is in the proper format by comparing the format of the received mail mimic message data to the one or more pre-defined formats. If, for example, the received mail mimic message data is not in the proper format, the message format module 208 may transmit an improper format notification message to the user via the user system. If, however, the received mail mimic message data is in the proper format, the message format module 208 may access the email system information that is stored in the user's profile to reformat the received mail mimic message data into a format that is dictated by the type of email system on which the user's email account exists.

In one embodiment, the message format module 208 may store one or more pre-defined formats associated with one or more mail service operations. In another embodiment, the one or more pre-defined formats may be retrieved and downloaded to the user system in response to a request from a user.

For example, the message format module 208 may reformat the received mail mimic message data into a first format that is associated with a first type of email system (e.g., an Outlook email system). In another example, the message format module 208 may reformat the received mail mimic message data into a second format that is associated with a second type of email system (e.g., a Lotus Notes email system).

The message format module 208 may include computer-implemented software, hardware, or a combination of both, configured to reformat one or more successful operation notification messages received from an email system for transmission to a user system. In one embodiment, a successful operation notification message may be transmitted to a user via a user system when a mail service operation has been successfully performed by an email system in accordance with a mail mimic message.

The email system module 210 may include computer-implemented software, hardware, or a combination of both, configured to establish a communication connection with an email system on which a user's email account exists. In such embodiments, the email system module 210 may authenticate with the email system. Upon a successful authentication process, the email system module 210 may be configured to transmit one or more command signals in the form of reformatted mail mimic message data signals to an email system to initiate the performance of one or more mail service operations indicated in the mail mimic message data. In one embodiment, the one or more command signals may be transmitted to the email system along with identification data that may be used to identify the user or the user system associated with the user.

The validation module 212 may include computer-implemented software, hardware, or a combination of both, configured to validate that the mail service operation requested in the mail mimic message data received is permissible. In such embodiments, the validation module 212 may be configured to compare the mail service operation requested to one or more permissible mail service operations (as defined by the implementers of the mail mimic system). If, for example, the mail service operation requested is permissible, the validation module 212 may allow the mail service operation to be processed and executed. If, however, the mail service operation requested is not permissible, the validation module 212 may transmit an impermissible mail service operation request message to a user via a user system. The permissions that indicate a user's ability to initiate a particular mail service operation may be set by the implementers of the mail mimic system (e.g., a system administrator).

Figure 3:
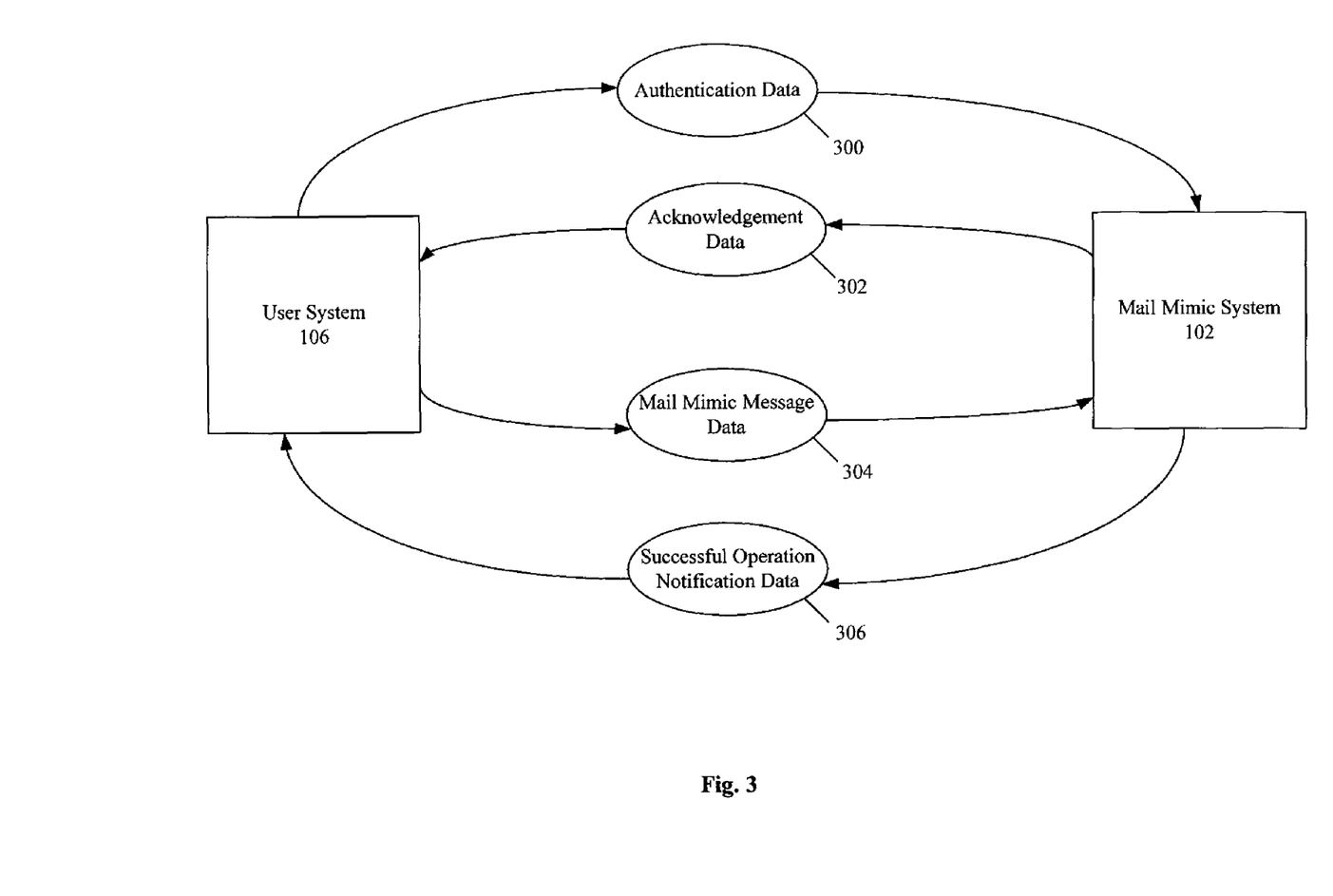
FIG. 3 illustrates a schematic diagram illustrating the interaction between a user system and a mail mimic system according to a particular embodiment.

FIG. 3 illustrates a schematic diagram illustrating the interaction between a user system and a mail mimic system according to a particular embodiment. As illustrated in FIG. 3, various types of data may be transmitted between the user system 106 and the mail mimic system 102 to allow a user to access one or more email systems that are coupled to one or more private networks remotely.

By way of non-limiting example, a user of user system 106 may transmit authentication data 300 to the mail mimic system 102 to authenticate with the mail mimic system 102. In one embodiment, authentication data 300 may include an unique authentication code provided to the user during a registration stage. In response to receiving the authentication data 300, the mail mimic system 102 may transmit acknowledgement data 302 to the user via the user system 106. Acknowledgement data may include data that indicates that the mail mimic system 102 has authenticated a user and is ready to receive mail mimic message data. The user may then transmit mail mimic message data 304 in a particular format to initiate the performance of a mail service operation by an email system. If, for example, the mail service operation is successfully performed by an email system, the mail mimic system 102 may transmit successful operation notification data 306 to the user system. If, however, the mail service operation is not successfully performed by an email system, the mail mimic system 102 may transmit one or more failure notification to the user system 106.

Figure 4:
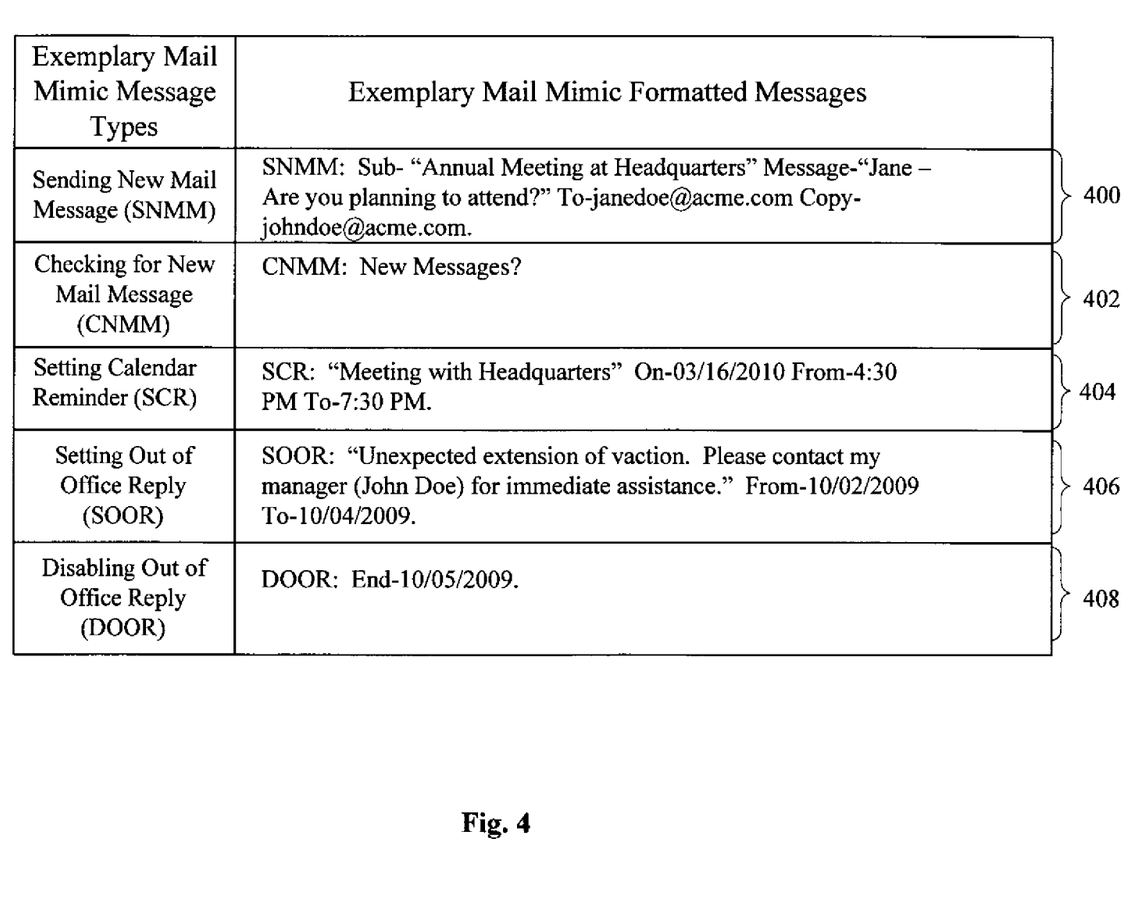
FIG. 4 is a table of exemplary mail mimic message types and exemplary mail mimic message data according to a particular embodiment.

FIG. 4 is a table of exemplary mail mimic message types and exemplary mail mimic message data according to a particular embodiment. As illustrated in FIG. 4, the mail mimic system 102 may support one or more mail mimic message types (e.g., support the initiation of one or more types of mail service operations).

For example, the mail mimic system 102 may support a Sending-New-Mail mail mimic message that triggers an email system to perform a Sending-New-Mail mail service operation in accordance with received mail mimic message data. Accordingly, a mail mimic system that receives mail mimic message data 400 may initiate an email system to send a new email message of "Jane-Are you planning to attend" to "janedoe@acme.com" and "johndoe@acme.com."

In another example, the mail mimic system 102 may support a Checking-for-New-Mail mail mimic message that triggers an email system to perform a Checking-for-New-Mail mail service operation in accordance with received mail mimic message data. Accordingly, a mail mimic system that receives mail mimic message data 402 may initiate an email system to check for new mail. In one embodiment, the Checking-for-New-Mail mail service operation may be configured to check for new email within a specified period of time (e.g., check for new email from Dec. 1, 2009 at 3 PM to Dec. 3, 2009 at 6 AM).

In yet another example, the mail mimic system 102 may support a Setting-Calendar-Reminder mail mimic message that triggers an email system to perform a Setting-Calendar-Reminder mail service operation in accordance with received mail mimic message data. Accordingly, a mail mimic system that receives mail mimic message data 404 may initiate an email system to set a new calendar reminder that indicates a "Meeting at Headquarters" on "Mar. 16, 2010."

In yet another example, the mail mimic system 102 may support a Setting-Out-of-Office-Reply mail mimic message that triggers an email system to perform a Setting-Out-of-Office-Reply mail service operation in accordance with received mail mimic message data. Accordingly, a mail mimic system that receives mail mimic message data 406 may initiate an email system to set an Out-of-Office reply from Oct. 2, 2009 to Oct. 4, 2009 that recites "Unexpected extension of vacation. Please contact my manager (John Doe) for immediate assistance."

In yet a further example, the mail mimic system 102 may support a Disabling-Out-of-Office-Reply mail mimic message that triggers an email system to perform a Disabling-Out-of-Office-Reply mail service operation in accordance with received mail mimic message data. Accordingly, a mail mimic system that receives mail mimic message data 408 may initiate an email system to disable an Out-of-Office reply on Oct. 5, 2009.

In yet a further example, the mail mimic system 102 may support other mail service operations, such as checking for unread emails or any other mail service operation that is supported by the email system.

Figure 5:
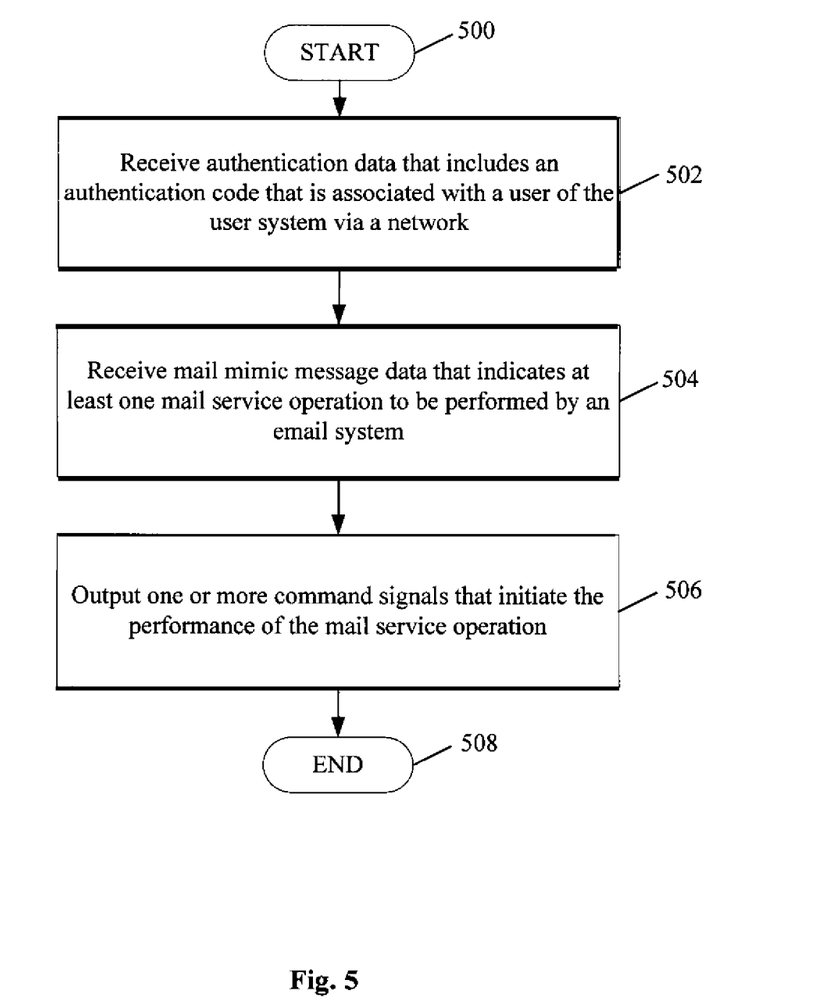
FIG. 5 is a flowchart illustrating the functionality of a particular embodiment.

FIG. 5 is a flowchart illustrating the functionality of a particular embodiment. This exemplary method is provided by way of example, as there are a variety of ways to carry out methods disclosed herein. The method shown in FIG. 5 may be executed or otherwise performed by one or a combination of various systems. The method is described below as carried out by the mail mimic system 102 shown in FIG. 1 by way of example, and various elements of the mail mimic system 102 are referenced in explaining the example method of FIG. 5. Each block shown represents one or more processes, methods, or subroutines carried out in the exemplary method. Referring to FIG. 5, the exemplary method may begin at block 500.

In block 502, the method may include receiving authentication data that includes an authentication code that is associated with a user of the user system via a network. In one embodiment, the authentication module 206 of the mail mimic system 102 may receive authentication data that includes an authentication code that is associated with a user of the user system via a network.

The method may use the authentication data received to enable a user system to establish a connection (e.g., a handshake) with a mail mimic system. Using the authentication data, the mail mimic system may authenticate the user or the user system based on the identification data (e.g., mobile telephone number associated with a mobile telephone, a personal email address accessible from a personal computer) associated with the connection mechanism (e.g., mobile telephone, personal computer) from which the handshake is initiated. If, for example, the mail mimic system is unable to authenticate the user or user system (e.g., validate the authentication data), the mail mimic system may transmit an error message to the user via the user system. If, however, the mail mimic system is able to authenticate the user or user system, the mail mimic system may transmit acknowledgement data to confirm the handshake to the user via the user system. The method may continue to block 504.

In block 504, the method may include receiving mail mimic message data that indicates at least one mail service operation to be performed by an email system. In one embodiment, the controller module 202 of the mail mimic system 102 may receive mail mimic message data that indicates at least one mail service operation to be performed by an email system.

The method may validate the format of the received mail mimic message data to ensure that the mail mimic message data received follows at least one format that is associated with a mail service operation. If, for example, the mail mimic system is unable to validate the format of the received mail mimic message data, the mail mimic system may transmit an error message to the user via the user system. If, however, the mail mimic system is able to validate the format of the received mail mimic message data, the mail mimic system may format the received mail mimic message data into an email system format that is associated with the email system on which the user's email account resides based on the registration data received during the registration stage.

The method may then attempt to establish a connection with the email system on which the user's email account resides. If, for example, the mail mimic system is unable to establish a connection with the email system, the mail mimic system may transmit an error message (e.g., a connection failure error message) to the user via the user system. In one embodiment, the mail mimic system may be configured to continue to attempt to establish a connection with the email system for a pre-determined amount of times in the event of a connection failure. The amount of times for connection retries may be determined by the implementers of the mail mimic system in accordance with design preferences. If, however, the mail mimic system is able to establish a connection with the email system, the method may continue in block 506.

In block 506, the method may include outputting one or more command signals that initiate the performance of the mail service operation. In one embodiment, the email system module 210 of the mail mimic system 102 may output one or more command signals that initiate the performance of the mail service operation. The command signals may be transmitted with identification data or registration data associated with the user. If, for example, the execution of the mail service operation is not successful, the mail mimic system may transmit notification data that indicates the command failure to the user via the user system. If, however, the execution of the mail service operation is successful, the mail mimic system may transmit notification data that indicates the command success along with the output of the mail service operation to the user via the user system. The method may then end at block 508.

Figure 6:
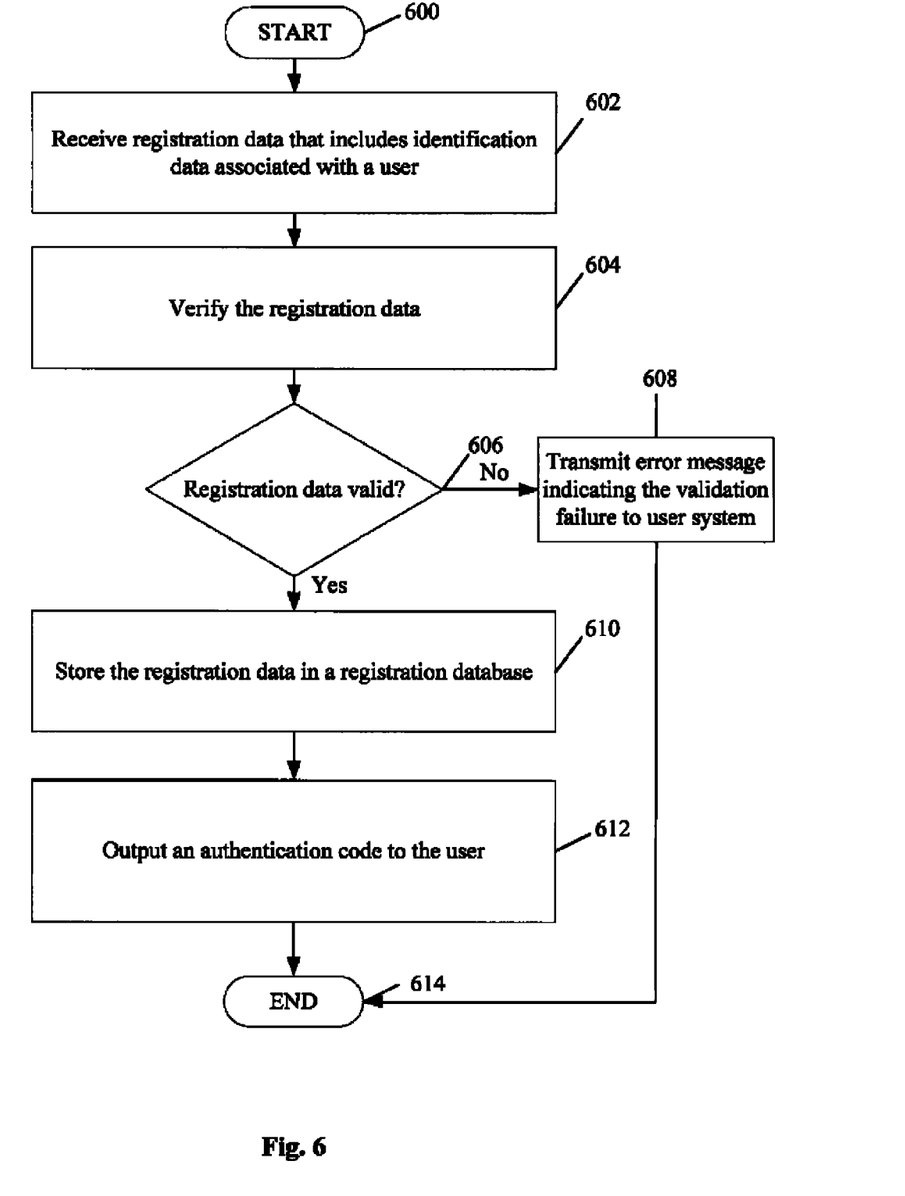
FIG. 6 is a another flowchart illustrating the functionality of a particular embodiment.

FIG. 6 is a another flowchart illustrating the functionality of a particular embodiment. This exemplary method is provided by way of example, as there are a variety of ways to carry out methods disclosed herein. The method shown in FIG. 6 may be executed or otherwise performed by one or a combination of various systems. The method is described below as carried out by the mail mimic system 102 shown in FIG. 1 by way of example, and various elements of the mail mimic system 102 are referenced in explaining the example method. Each block shown in FIG. 6 represents one or more processes, methods, or subroutines carried out in the exemplary method. Referring to FIG. 6, the exemplary method may begin at block 600.

In block 602, the method may include receiving registration data that includes identification data from a user. In one embodiment, the registration module 204 of the mail mimic system 102 may receive registration data that includes identification data from a user.

In one embodiment, registration data may include any, or a combination, of one or more mobile telephone numbers associated with one or more user systems from which a user intends to transmit mail mimic message data to the mail mimic system, one or more email addresses associated with one or more email accounts from which a user intends to transmit mail mimic message data to the mail mimic system, information associated with one or more email systems (e.g., internet protocol (IP) address of an email system, name of an email system, type of email system) at which a user has an email account a user code (e.g., an employee code), a date on which a user is associated with the implementers of the remote access system (e.g., a date on which a employee started working at a company implementing the remote access system), a user's date of birth, or any other information that may be used to validate a user's identity. The method may continue to block 604.

In block 604, the method may include verifying the registration data. In one embodiment, the registration module 204 of the mail mimic system 102 may verify the registration data.

Verifying the registration data may include determining whether the details provided in the registration data are stored on the mail mimic system or on a storage location accessible by the mail mimic system. If, for example, the mail mimic system is unable to verify the registration data, the mail mimic system may transmit a verification failure error message to the user via the user system in block 608. If, however, the mail mimic system is able to verify the registration data, the method may continue to block 610.

In block 610, the method may include storing the registration data in a registration database. In one embodiment, the registration module 204 of the mail mimic system 102 may store the registration data in a registration database. The method may continue to block 612.

In block 612, the method may include outputting an authentication code to the user. In one embodiment, the registration module 204 of the mail mimic system 102 may output an authentication code to the user. The method may then end at block 614.

The description above describes systems and networks that may include one or more modules, some of which are explicitly shown in the figures. As used herein, the term "module" may be understood to refer to any, or a combination, of computer executable computing software, firmware, and hardware. It is noted that the modules are exemplary. The modules may be combined, integrated, separated, or duplicated to support various applications. Also, a function described herein as being performed at a particular module may be performed at one or more other modules or by one or more other devices instead of or in addition to the function performed at the particular module. Further, the modules may be implemented across multiple devices or other components local or remote to one another. Additionally, the modules may be moved from one device and added to another device, or may be included in multiple devices.

It is further noted that the software described herein may be tangibly embodied in one or more physical media, such as, but not limited to any, or a combination, of a compact disc (CD), a digital versatile disc (DVD), a floppy disk, a hard drive, read only memory (ROM), random access memory (RAM), and other physical media capable of storing software. Moreover, the figures illustrate various components (e.g., systems, networks) separately. The functions described as being performed at various components may be performed at other components, and the various components may be combined or separated. Other modifications also may be made.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A system, comprising:
   an authentication computing apparatus configured to receive, from a user system, authentication data that comprises an authentication code that is associated with a user of the user system via a network;
   a controller computing apparatus configured to receive, from the user system, mail mimic message data that indicates at least one mail service operation to be performed by an email system, wherein a format of the mail mimic message data indicates the at least one mail service operation to be performed by the email system;
   a message format computing apparatus configured to determine whether the format of the mail mimic message data is in a proper format by comparing the format of the received mail mimic message data to one or more pre-defined formats associated with the at least one mail service operation; and
   an email system computing apparatus configured to output, to the email system, one or more command signals that initiate the performance of the at least one mail service operation.

2. The system of claim 1, further comprising a registration computing apparatus configured to receive registration data, from the user system, during a registration stage.

3. The system of claim 2, wherein the registration computing apparatus is further configured to output, to the user system, the authentication code during the registration stage.

4. The system of claim 1, wherein the authentication data comprises identification data.

5. The system of claim 4, wherein the authentication computing apparatus is further configured to authenticate the user using the authentication code and the identification data.

6. The system of claim 1, wherein the message format computing apparatus is configured to reformat the received mail mimic message data into the one or more command signals output to the email system by the email system computing apparatus, and is further configured to store the one or more pre-defined formats associated with the at least one mail service operation.

7. The system of claim 1, wherein the mail service operation is associated with at least one of a sending new mail operation, a checking for new mail operation, a setting calendar reminder operation, a setting an out of office reply operation, and a disabling an out of office reply operation.

8. The system of claim 1, wherein the message format computing apparatus is configured to reformat the mail mimic message data into an email system format that is associated with the email system.

9. The system of claim 1, wherein the email system computing apparatus is further configured to establish a connection with the email system.

10. The system of claim 4, wherein the email system computing apparatus is further configured to output by transmitting the identification data to the email system.

11. The system of claim 1, wherein the message format computing apparatus is configured to transmit an improper format notification message to the user via the user system if the received mail mimic message data is not in the proper format.

12. A method, comprising:
- receiving, from a user system, authentication data that comprises an authentication code that is associated with a user of the user system via a network;
- receiving, from the user system, mail mimic message data that indicates at least one mail service operation to be performed by an email system, wherein a format of the mail mimic message data indicates the at least one mail service operation to be performed by the email system;
- determining whether the format of the mail mimic message data is in a proper format by comparing the format of the received mail mimic message data to one or more pre-defined formats associated with the at least one mail service operation; and
- outputting, to the email system, one or more command signals that initiate the performance of the at least one mail service operation.

13. The method of claim 12, further comprising receiving registration data, from the user system, during a registration stage.

14. The method of claim 13, further comprising outputting, to the user system, the authentication code during the registration stage.

15. The method of claim 12, wherein the authentication data comprises identification data.

16. The method of claim 15, further comprising authenticating the user using the authentication code and the identification data.

17. The method of claim 15, wherein outputting further comprises transmitting the identification data to the email system.

18. The method of claim 12, further comprising reformatting the mail mimic message data is into the one or more command signals, and storing the one or more pre-defined formats associated with the at least one mail service operation.

19. The method of claim 12, wherein the mail service operation is associated with at least one of a sending new mail operation, a checking for new mail operation, a setting calendar reminder operation, a setting an out of office reply operation, and a disabling an out of office reply operation.

20. The method of claim 12, further comprising reformatting the mail mimic message data into an email system format that is associated with the email system.

21. The method of claim 12, further comprising establishing a connection with the email system.

22. A non-transitory computer readable media comprising code to perform the acts of the method of claim 12.

* * * * *